US008537426B2

(12) United States Patent
Saka

(10) Patent No.: US 8,537,426 B2
(45) Date of Patent: Sep. 17, 2013

(54) IMAGE PROCESSING METHOD, IMAGE PROCESSING APPARATUS, AND COMPUTER-READABLE STORAGE MEDIUM FOR COMPUTER PROGRAM FOR GENERATING AN INTEGRATED DUPLICATE BY PRINTING IMAGES OF A PLURALITY OF DOCUMENTS ON A SINGLE SHEET OF RECORDING PAPER OR A PLURALITY OF CONTINUOUSLY-FED SHEETS OF RECORDING PAPER

(75) Inventor: Masaaki Saka, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 507 days.

(21) Appl. No.: 12/857,786

(22) Filed: Aug. 17, 2010

(65) Prior Publication Data

US 2011/0043863 A1 Feb. 24, 2011

(30) Foreign Application Priority Data

Aug. 21, 2009 (JP) ................................ 2009-192566

(51) Int. Cl.

*H04N 1/40* (2006.01)
*H04N 1/32* (2006.01)
*G06K 15/02* (2006.01)
*G06K 19/06* (2006.01)
*G06F 21/10* (2013.01)

(52) U.S. Cl.

USPC ........ 358/3.24; 358/1.18; 358/3.28; 235/494; 726/26

(58) Field of Classification Search

USPC .......................................................... 235/494

See application file for complete search history.

(56) References Cited

U.S. PATENT DOCUMENTS

| | | | | |
|---|---|---|---|---|
| 8,371,511 | B2 * | 2/2013 | Tokumaru | 235/494 |
| 2010/0140362 | A1 | 6/2010 | Tokumaru | |

FOREIGN PATENT DOCUMENTS

| | | |
|---|---|---|
| JP | 7-114299 A | 5/1995 |
| JP | 2006-259045 | 9/2006 |
| JP | 2007-081936 A | 3/2007 |
| JP | 2010-200301 | 9/2010 |

OTHER PUBLICATIONS

Office Action (Notification of Reason(s) for Refusal) dated Jul. 5, 2011, issued in the corresponding Japanese Patent Application No. 2009-192566, and an English Translation thereof.

* cited by examiner

*Primary Examiner* — Barbara Reinier

(74) *Attorney, Agent, or Firm* — Buchanan Ingersoll & Rooney PC

(57) ABSTRACT

An image forming apparatus includes an image reader that reads each of the plurality of documents and obtains image data corresponding thereto; a code detection/analysis portion that detects, from the image data, identification codes included in the documents and including output processing information which is information relating to an output processing method for the image data; a image group extraction portion that extracts an image data group made up of image data including the output processing information that is identical with each another; and a representative image determination portion that determines, within the image data group, at least one piece of representative image data; and a code deletion portion that deletes identification codes other than those for the representative image data within the image data group.

12 Claims, 8 Drawing Sheets

BOOKLET COPY

BOOKLET COPY

BOOK DIVIDED COPY

IMAGE PROCESSING METHOD, IMAGE PROCESSING APPARATUS, AND COMPUTER-READABLE STORAGE MEDIUM FOR COMPUTER PROGRAM FOR GENERATING AN INTEGRATED DUPLICATE BY PRINTING IMAGES OF A PLURALITY OF DOCUMENTS ON A SINGLE SHEET OF RECORDING PAPER OR A PLURALITY OF CONTINUOUSLY-FED SHEETS OF RECORDING PAPER

This application is based on Japanese Patent Application No. 2009-192566 filed on Aug. 21, 2009, the contents of which are hereby incorporated by reference.

BACKGROUND OF THE INVENTION

1. Field of the Invention

The present invention relates to an image processing method, an image processing apparatus, and a computer-readable storage medium for computer program for processing an identification code such as a QR Code when copies are made in a booklet copy mode or an N-in-1 copy mode.

2. Description of the Related Art

Conventionally, it is possible for an MFP (Multi Function Peripheral) that serves as a copier or a digital multi functional apparatus to create a combined copy by printing images of a plurality of documents on a single sheet of recording paper or a plurality of continuously-fed sheets of recording paper, i.e., create a combined copy or booklet copy.

In recent years, an identification code such as the QR Code (Registered Trademark) has been added to various printed matters or products for the management of such printed matters or products. Along with this trend, there have been also proposed MFPs that are provided with a function of processing the identification code.

The image data processing apparatus disclosed in JP-H07-114299-A controls the output of images based on additional information having higher priorities among those read out from a plurality of document images, and creates and outputs on paper new additional information based on the individual pieces of additional information that are read out.

Further, when an image forming apparatus disclosed in JP-2007-081936-A makes combined copies using a plurality of documents having individual two-dimensional bar codes added thereto, the apparatus creates new two-dimensional bar codes from the individual two-dimensional bar codes and prints the resultants together with image data on output paper.

The documents used for the combined copy or the booklet copy are made up of a plurality of documents related to one another. For this reason, the identification codes attached to the individual documents are sometimes identical. When the plurality of documents having an identical identification code attached thereto are copied in the combine copy mode, an identical identification code is attached to individual pages of the copy, which results in a finished copy including in its entirety a plurality of identical identification codes. When such a finished copy is used for a generation copy, an MFP is to detect and analyze a plurality of identical identification codes.

For example, assuming that a brochure is produced using eight A4 size documents to which individual identification codes including transmission prohibiting information are added. In this case, the documents are copied in a booklet copy mode to obtain two sheets of finished copy (duplex-sided copy) which are then folded in two and bound to be finished as an eight-page A5-size brochure. Images of the documents are reduced in size and copied into individual pages. The copied images include the identification codes attached to the individual documents as they are.

Next, when the brochure is further duplicated, which means that when the second generation copy of the documents from which the brochure is duplicated is made, a user places the two sheets of copies that form the brochure in the MFP and enters instructions for copying on an operation panel. The MFP, by receiving the instructions, reads the images on the two sheets of copies and, in addition, detects eight identification codes in total to perform analysis and processing.

However, since all of the images on the two sheets of copies that have been read based on the instructions for copying by the user are dealt with as a single process or job, it is sufficient to perform control on the job based on the single identification code. Therefore, the remaining seven identification codes are redundant and unnecessary.

In this way, conventionally, unnecessary identification codes are detected, analyzed, and processed when the generation copies are made, which consumes undue period for image processing.

SUMMARY OF THE INVENTION

The present invention is made in view of the foregoing problem, and it is an object of the present invention to reduce wasteful time by reducing unnecessary identification codes, which is otherwise required for a work such as processing for analyzing identification codes when a generation copy is made.

According to an aspect of the present invention, an image processing method for generating an integrated duplicate by printing images of a plurality of documents on a single sheet of recording paper or a plurality of continuously-fed sheets of recording paper, the method includes a first step of reading each of the plurality of documents and obtaining image data corresponding thereto, a second step of detecting identification codes included in the plurality of documents from individual pieces of the image data, a third step of extracting image data including identification codes that are identical with one another, and a fourth step of keeping at least one of the identification codes included in the image data extracted in the third step and deleting the identification codes other than said at least one of the identification codes.

The third step may be arranged to extract an image data group made up of one or more pieces of image data including an identical identification code or identical output processing information included in the identification codes.

These and other characteristics and objects of the present invention will become more apparent by the following descriptions of preferred embodiments with reference to drawings.

DESCRIPTION OF THE PREFERRED EMBODIMENTS

Figure 1:
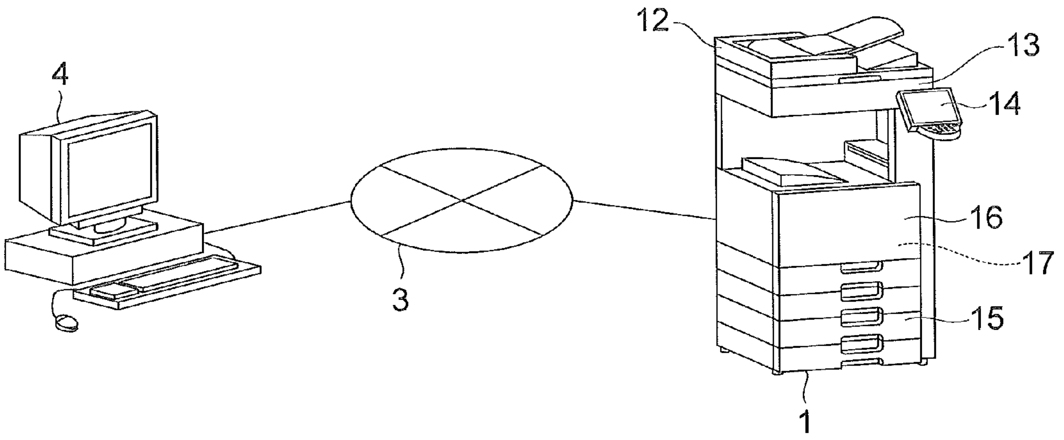
FIG. 1 is a diagram illustrating an example of a configuration of a network system including an image forming apparatus.

In FIG. 1, an image forming apparatus 1 is connected to a personal computer 4 etc. through a network 3. The network 3 includes LANs, WANs, the Internet, public lines, dedicated lines, or the like.

The image forming apparatus 1 is an apparatus called an MFP (Multi Function Peripheral) and is configured to integrate therein a variety of functions such as copying, faxing, network printing, scanning, and a box function. Particularly, the image forming apparatus 1 according to this embodiment is capable of performing an integrated copy such as a 2-in-1 copy, a booklet copy in which a plurality of copies are produced and arranged into a booklet style, and the like. The image forming apparatus 1 is also capable of processing an identification code SC such as a QR (Quick Response) Code which is one type of two-dimensional bar codes.

As illustrated in FIG. 1, the image forming apparatus 1 is provided with an automatic document feeder (ADF) 12, an image reader 13, an operation panel 14, a paper feeder 15, a print engine 16, a control processor 17, and so on.

The automatic document feeder 12 automatically feeds documents placed on a document tray in accordance with the instructions.

The image reader 13 scans the surface of a document that has been fed thereto according to the size of a document GK and outputs image data D1.

The operation panel 14 is configured of a display section (touch panel) for displaying an operational status of the image forming apparatus 1 and displaying operational screens of various functions and a variety of keys for operating the image forming apparatus 1.

The paper feeder 15 feeds out a sheet of paper stored in a paper feeding cassette and feeds the sheet of paper to the print engine 16.

The print engine 16, after the image data D1 or image data externally transmitted has undergone various processes, prints an image from the resultant image data on paper by the electrophotographic process.

The control processor 17 controls an entirety of the image forming apparatus 1 based on commands received on the operation panel 14 and performs various image processing. In this embodiment, the outlines of the functions that are realized by the control processor 17 are described below.

Specifically, the control processor 17 is provided with a first portion that reads documents and obtains image data of the individual documents; a second portion that detects, from each piece of the image data, an identification code included in the document and containing output processing information which is information about an output processing method applied to the image data; a third portion that extracts an image data group consisting of image data having identical output processing information that is included in the identification code; and a fourth portion that determines at least one piece of representative image data from among the image data included in each of the image data groups and deletes identification codes attached to other image data than the piece of representative image data.

It is also possible to provide a fifth portion that generates a modified identification code including the output processing information which has been included in the deleted identification code, and adds the generated modified identification code to the individual pieces of representative image data in place of the identification code included in the individual pieces of representative image data.

The modified identification code may include information that identifies image data from which the identification code attached thereto has been deleted, among image data of the image data group including therein the piece of representative image data to which the modified identification code is attached.

The fourth portion may be arranged not to delete the identification code from such image data if the output processing information of such image data includes information indicating that duplication or transmission of a part or a whole of image data is prohibited.

It is also possible to organize the second portion so that it obtains positional information that identifies a position of the identification code in the document image, and organize the fifth portion so that it determines a position in which the modified identification code is added based on the positional information.

The fifth portion is capable of generating the modified identification code in a size at a predetermined scaling factor relative to the identification code and adding the resultant modified identification code.

The image forming apparatus 1 may be arranged to divide a document image of a single document into a plurality of divided images, print the divided images onto different sheets of recording paper individually, and thereby produce a duplicate of the document image divided on a plurality sheets of recording paper. In this case, the image forming apparatus 1 may be provided with: a first portion that reads a document and obtains image data corresponding to the image of the document; a second portion that detects an identification code which is included in the document and contains therein information about the output processing method of the document; and a fifth portion that performs editing so that each of the divided images includes the detected identification code.

The function of the control processor 17 will be described in details later.

Figure 2:
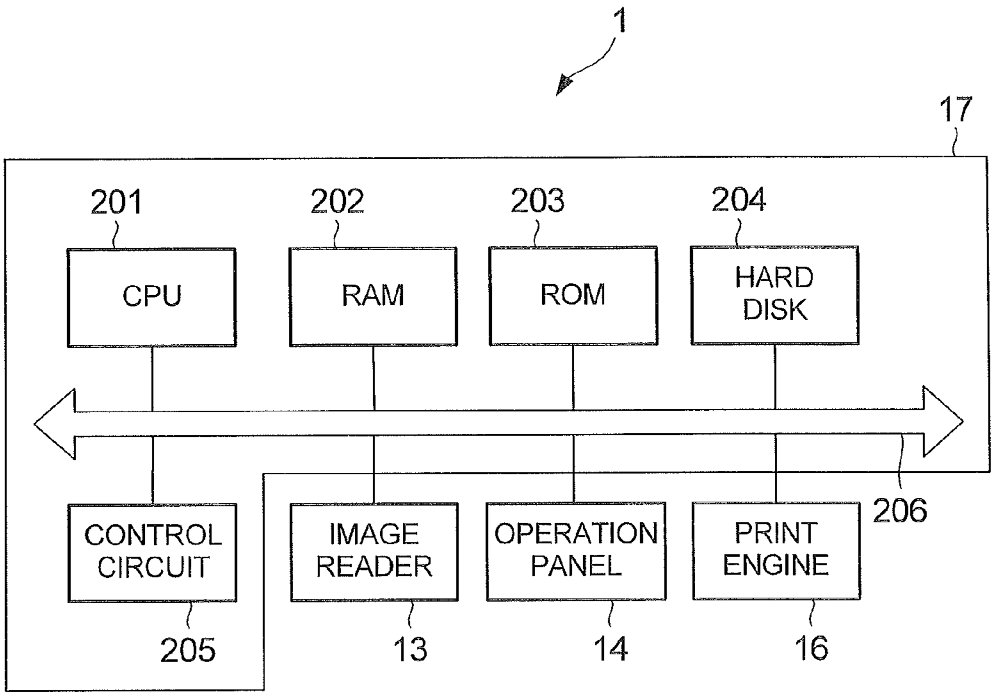
FIG. 2 is a diagram illustrating an example of a hardware configuration of an image forming apparatus.

FIG. 2 is a diagram illustrating an example of a hardware configuration of the image forming apparatus 1.

A QR Code will be taken as an example of the identification code SC that is included in or added to the document. However, it is also possible to use two-dimensional bar codes other than the QR Code, one-dimensional bar codes such as ordinary bar codes, and other types of codes that can be detected and analyzed in the image forming apparatus 1.

Referring to FIG. 2, the image forming apparatus 1 is provided with a Central Processing Unit (CPU) 201, a Random Access Memory (RAM) 202, a Read-Only Memory (ROM) 203, a hard disk 204, a control circuit 205, an image reader 13, an operation panel 14, a print engine 16, and so on. Each of these portions is connected to each another through a bus 206.

The CPU 201 executes various programs (computer programs) stored in the ROM 203 to thereby perform image processing including a process on an identification code, which will be described later, and other processes and functions of different kinds.

The RAM 202 serves to store data therein temporarily. In this embodiment, the RAM 202 memorizes, for example, such information as the positional information of the identification code SC and restoration information of the identification code SC.

The ROM 203 stores therein, in advance, various programs and operation messages required for the operation of the image forming apparatus 1.

The hard disc 204 stores therein the image data D1 outputted from the image reader 13, and other data or programs.

The control circuit 205, in conjunction with the CPU 201, controls the hard disk 204, the image reader 13, the operation panel 14, the print engine 16, and so on.

The control processor 17 is configured of the CPU 201, the RAM 202, the ROM 203, the hard disk 204, the control circuit 205, and the like.

Next, a description will be given of the functions that are realized by the control processor 17.

Figure 3:
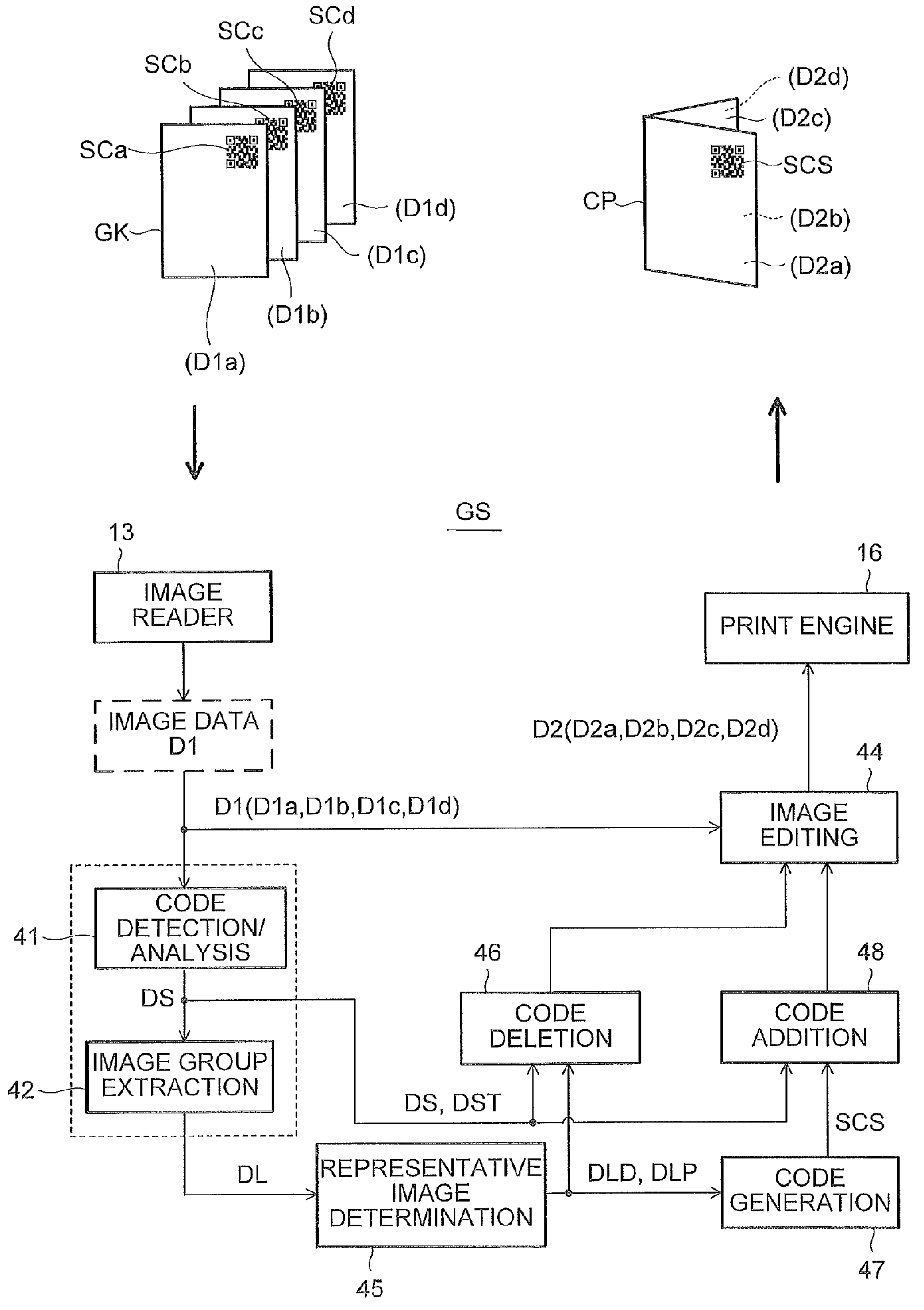
FIG. 3 is a block diagram illustrating an example of a functional configuration of an image forming apparatus.

FIG. 3 is a block diagram illustrating a functional configuration of an image processing portion GS that is implemented by the control processor 17, according to a first embodiment.

Referring to FIG. 3, the image processing portion GS is provided with a code detection/analysis portion 41, an image group extraction portion 42, an image editing portion 44, a representative image determination portion 45, a code deletion portion 46, a code generation portion 47, a code addition portion 48, and the like.

The image reader 13 reads one or more sheets of document GK and outputs image data D1. If the document GK is made up of a plurality of sheets, a quantity of the image data D1 thus obtained corresponds to the number of the sheets of the document GK. In the example illustrated in the upper part of FIG. 3, a plurality of pieces of image data D1, i.e., D1*a*, D1*b*, D1*c*, and D1*d*, corresponding to four sheets of document GK are obtained. When copies are made in an integrated copy mode or a booklet copy mode, the plurality of sheets of the document GK are read in succession as a group of a series of documents. The image data D1 thus obtained from the document GK is forwarded to the code detection/analysis portion 41 and the image editing portion 44.

A region determination process, an edge enhancement process, an image quality adjustment process, and other various types of input image processing are performed as necessary on the image data D1.

The code detection/analysis portion 41 detects, from the pieces of the image data D1, identification codes SC, i.e., SCa to SCd, which are included in the document GK, and analyzes them. In other words, the code detection/analysis portion 41 detects the presence or absence of an identification code SC that is added to the original image of the document GK and analyzes what is indicated by the identification code SC if the identification code SC is present.

Identification code information DS which is a piece of information representing an image shape, a type, contents, a size, and the like of the identification code SC is obtained as a result of analyzing the identification code SC. The code detection/analysis portion 41 also obtains, as a part of the identification code information DS, positional information DST that identifies a position of the detected identification code SC in the document GK to which the identification code SC originally belongs.

The identification code SC, i.e., the identification code information DS, includes such information as outputting conditions of the document GK to which this identification code SC is added, and an operational mode relating to how the document GK is processed, for example, information (output processing information) relating to an output processing method of the document GK. Specifically, such information may include a condition for making a 2-in-1 copy, a condition for making a booklet copy, copy prohibiting information, copy restriction information, transmission prohibiting information, transmission restriction information, E-mail attachment prohibiting information, E-mail attachment restriction information, and so on. Such information may also include a type of the document GK, the number of sheets or pages of the entire document GK, information on whether the document GK is in color or in black and white, document creator information, document creation time and date information, and so on.

The image group extraction portion 42 extracts an image data group DL made up of image data D1 of which the identification code information DS is identical. The number of the image data groups DL may be one, two or more, or sometimes nil. It is not necessary to extract the image data D1 itself, but it is simply a matter of grouping together such image data D1 or document GK having an identical identification code included therein among a plurality of pieces of image data D1 or a plurality sheets of document GK. For example, the image data group DL may be in a form of a list of image data D1 or document GK having identical identification code information DS.

In determining whether the identification code information DS is identical or not with each another, it is possible to determine that the identification code information DS is identical in various cases including where all of the identification code information DS included in the identification codes SC is identical, a part of the identification code information DS is identical, particularly the output processing information is identical, or a part of the output processing information is identical. Alternatively, it is also possible to compare the shapes of the identification codes SC and determine that the identification code information DS is identical if there is no significant difference among the shapes. It is also possible to set conditions in advance to determine in which case the identification codes SC or the identification code information DS is assumed identical.

For example, according to an example of a document GK illustrated in the upper part of FIG. 3, the identification codes SC (SCa, SCb, SCc, and SCd) added to the image data D1 (D1*a*, D1*b*, D1*c*, and D1*d*), respectively, are identical with each other. Consequently, the identification code information DS included in individual identification codes SC is also identical with each another. In this case, the four pieces of image data D1*a*, D1*b*, D1*c*, and D1*d* form a group as the image data group DL whose quantity is one.

The image editing portion 44 performs image editing on the image data D1 to cope with various modes of copies such as a 2-in-1 copy, a booklet copy, a double-sided copy, a scaled copy, a book divided copy (copies are made on two different sheets from facing pages of a book). The image editing portion 44 also performs deletion and addition of an identification code SC from and to the image data D1. To be specific, the image editing portion 44 deletes (erases) an identification code SC in a predetermined page in the image data D1 based on a command from the code deletion portion 46. The image editing portion 44 also adds a modified identification code SCS to a predetermined page in the image data D1 based on a command from the code addition portion 48.

According to an example of a duplicate CP illustrated in the upper part of FIG. 3, image editing for a booklet copy is performed on image data D1 (D1*a*, D1*b*, D1*c*, and D1*d*) obtained from the document GK. To be more specific, the image editing portion 44 deletes each of the identification codes SC (SCa, SCb, SCc, and SCd) included in the image data D1 (D1*a*, D1*b*, D1*c*, and D1*d*). Then, a modified identification code SCS, which is a modified version of the identification code, is added to the image data D1*a* having the smallest page number among the image data D1 (D1*a*, D1*b*, D1*c*, and D1*d*) from which the identification codes SC have been deleted.

The representative image determination portion 45 determines, for each of the image data groups DL, at least one piece of representative image data DLD among image data D1 included in each of the image data groups DL. The representative image data DLD may be one or more pieces. Various methods may be taken for determining the representative image data DLD by considering details of editing performed by the image editing portion 44. For example, according to the example of the duplicate CP illustrated in the upper part of FIG. 3, the image data D1*a* having the smallest page number among the image data D1 included in the image data group DL is taken as the representative image data DLD.

Alternatively, the representative image data DLD may be designated by user's operation through the operation panel 14. For example, the user may designate the image data D1*a* in the first page as the representative image data DLD so that only the identification code SCa added to the first page remains. Instead, the user may designate the image data Did in the last page as the representative image data DLD so that only the identification code SCd added to the last page remains.

It is also possible to make an arrangement such that the representative image determination portion 45 generates page designation information DLP that indicates image data D1 other than the representative image data DLD based on the representative image data DLD.

According to the example of the duplicate CP illustrated in the upper part of FIG. 3, since the representative image data DLD is the image data D1*a* in the page having the smallest page number, the page designation information DLP is generated to indicate other image data D1*b*, D1*c*, and D1*d*. Here, it is possible to use, for example, a reference to a page or a page number to indicate the representative image data DLD and for the page designation information DLP to make designation among all pieces of the image data D1 corresponding to a group of a series of documents.

The code deletion portion 46 instructs the image editing portion 44 to delete the identification code SC based on: the image shape of the identification code SC indicated in the identification code information DS; the positional information DST; the representative image data DLD or the page designation information DLP from the representative image determination portion 45; whether or not the modified identification code SCS generated in the code generation portion 47 is added to the representative image data DLD, or the like.

The code generation portion 47 generates, for identification code information DS of an identification code SC that is detected by the code detection/analysis portion 41, a modified identification code SCS including information about the identification code SC to be deleted. The information about the identification code SC to be deleted includes information that indicates a page to be deleted.

According to the example of the duplicate CP illustrated in the upper part of FIG. 3, the identification codes SCa, SCb, SCc, and SCd included respectively in the image data D1*a*, D1*b*, D1*c*, and D1*d* are deleted, and amongst which a modified identification code SCS is added to the image data D1*a*. The modified identification code SCS includes information indicating individual pages corresponding to the image data D1*b*, D1*c*, and D1*d* from which the identification codes SCb, SCc, and SCd are deleted, respectively.

The modified identification code SCS may include, in addition to information about the identification codes SCb, SCc, and SCd, other information indicating that it is a modified identification code SCS, indicating representative image data DLD, or indicating an image data group DL to which the modified identification code SCS belong.

The code generation portion 47 is capable of generating a modified identification code SCS in a size according to a predetermined scaling factor relative to its original identification code SC. For example, the scaling factor based on the size of the identification code SC may be set equal to a scaling factor for enlargement or reduction of size applied to the image data D1 by the image editing portion 44, i.e., equal to the scaling factor of copy. In this case, the appearance of the image of the duplicate CP which is printed is the same as that of the original document GK. In addition, the scaling factor applied to the identification code SC may be set to “1” regardless of the scaling factor applied to copying. In this case, even if the image based on the image data D1 is reduced in size, the image of the modified identification code SCS is not reduced, which makes it easy to detect and analyze the modified identification code SCS when a generation copy is made.

The code addition portion 48 instructs the image editing portion 44 to add a modified identification code SCS based on the information about an image shape of the identification code SC indicated in the identification code information DS, the positional information DST, and the representative image data DLD or the page designation information DLP from the representative image determination portion 45.

At the page into which the modified identification code SCS is added by the code addition portion 48, i.e., at the page of the representative image data DLD, the original identification code SC is deleted as described before. For each piece of image data D1 designated as the representative image data DLD, a modified identification code SCS is generated and added (re-added) thereto in place of the identification code SC which is originally included in each piece of the representative image data DLD. In this case, the modified identification code SCS includes information about the identification code SC that has been deleted based on the page designation information DLP.

According to the example of the duplicate CP illustrated in the upper part of FIG. 3, the original identification code SCa has been deleted, and a modified identification code SCS is added instead in the page of the image data D2*a* (representative image data DLD) to which the modified identification code SCS is added.

In this way, the image editing portion 44 edits the image data D1 (D1*a*, D1*b*, D1*c*, and D1*d*), and the image data D2 (D2*a*, D2*b*, D2*c*, and D2*d*) on which editing has been performed is outputted, printed on paper by the print engine 16, and discharged as the duplicate CP.

According to example of the document GK and the duplicate CP illustrated in the upper part of FIG. 3, for example, individual image data D1*a*, D1*b*, D1*c*, and D1*d* of the four sheets of documents GK in A4 size are reduced in size and printed on double sides of one A5 size sheet of paper as image data D2*a*, D2*b*, D2*c*, and D2*d* by making a booklet copy. In this case, a duplicate CP formed of four pages is obtained by folding the printed paper in two. In place of four identification codes SCa to SCd included in the four sheets of the document GK, a modified identification code SCS is printed on the first page of the duplicate CP instead of the identification code SCa, and the identification codes SC are deleted from the second to fourth pages having solely their individual original images printed thereon without addition of modified identification codes SCS.

Next, the processing performed on the identification code SC by the image processing portion GS will be described with reference to specific examples.

Figure 4A:
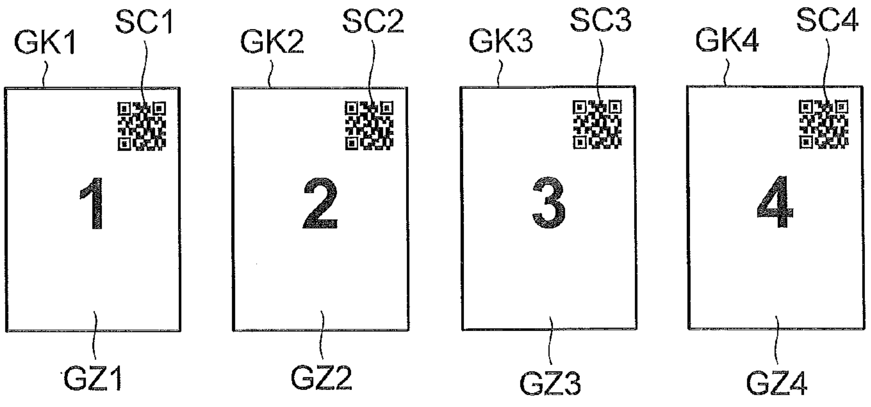
FIGS. 4A-4C illustrate an example in which 2-in-1 copies are made from four documents GK.
Figure 4B:
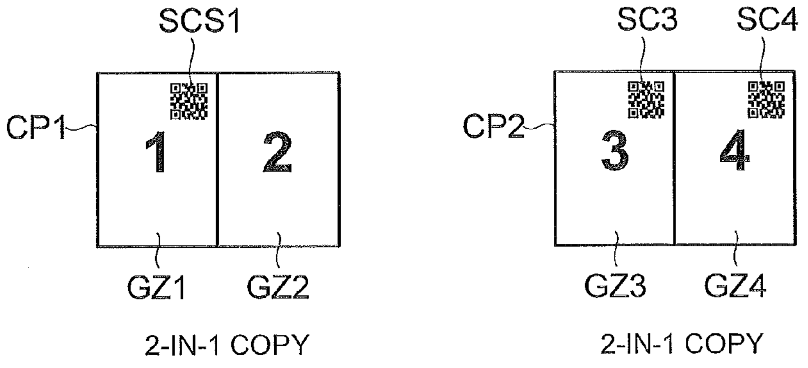
Figure 4C:
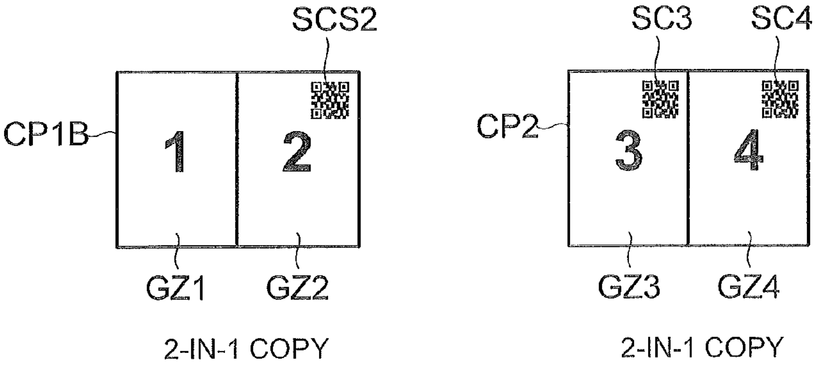

FIGS. 4A-4C illustrate how two duplicates CP1 and CP2 are obtained from four documents GK1-GK4 by performing 2-in-1 copying.

As illustrated in FIG. 4A, the documents GK1-GK4 include the identification codes SC1-SC4, respectively in addition to their individual original images GZ1-GZ4. Among these identification codes SC1-SC4, the identification codes SC1 and SC2 are identical with each other but different from the identification codes SC3 and SC4, and, in addition, the identification codes SC3 and SC4 are different from each other.

Referring to FIG. 4B, since copies are made in the 2-in-1 copy mode, the documents GK1 and GK2 are reduced in size and printed next to each other on one side of a first sheet of paper, and the documents GK3 and GK4 are reduced in size and printed next to each other on one side of a second sheet of paper.

The image processing portion GS detects that the identification codes SC1 and SC2 are identical, and that the image data D1*a* corresponding to the document GK1 and the image data D2*b* corresponding to the document GK2 belong to a single image data group DL. Then, the image data Dia printed on a page having a smaller page number than the other is determined to be a representative image data DLD. This results in deletion of the identification code SC2 that has been included in the document GK2. Also, a modified identification code SCS1 including information indicating that the identification code SC2 has been deleted and it is a 2-in-1 copy of the two documents GK1 and GK2 is generated and printed in a manner to replace the original identification code SC1 included in the document GK1. This means that the original identification code SC1 is deleted, and, in place of this, the modified identification code SCSI is generated and printed. In this way, the duplicate CP1 is obtained.

The documents GK3 and GK4 have the identification codes SC3 and SC4, respectively, which are different from each other. Therefore, the identification codes SC3 and SC4 are not deleted and are printed as is together with the individual images GZ3 and GZ4. In this way, the duplicate CP2 is obtained.

Accordingly, the duplicate CP1 does not include two identification codes SC that are identical with each other. As a result of this, when a generation copy is made, specifically, when the duplicate CP1 is used as a new document GK and copied, it is possible to detect only one modified identification code SCS1 and perform analysis and processing thereon. Therefore, it is possible to reduce a wasteful time required for analyzing two identification codes and thereby reduce a processing time. In this way, according to this embodiment, it is possible to reduce unnecessary identification codes.

Moreover, since the modified identification code SCS1 includes an indication that the document GK2 on the second page once had an identification code SC, it is also possible to restore the original state later. Alternatively, it is also possible to leave the identification code SC1 as is and simply delete the identification code SC2.

As illustrated in FIG. 4C, alternatively, it is also possible to arrange the image of the document GK2 as the representative image data DLD instead of the document GK1. In this case, in the duplicate CP1B corresponding to the document GK1, the identification code SC1 is deleted, and the modified identification code SCS2 which is generated for the document GK2 is added.

In the example described above, the scaling factor applied to the modified identification codes SCS1 and SCS2, and the identification codes SC3 and SC4 is the same as the reduction ratio applied to the images GZ1-GZ4. However, reducing the modified identification codes SCS or the identification codes SC in size may make it difficult to analyze them. As a preventive measure, it is also possible to print the modified identification codes SCS1 and SCS2, and the identification codes SC3 and SC4 at a 100% scaling factor without applying reduction thereto. Instead of 100% scaling factor, a reduction factor larger than the reduction factor applied to the copying of a document may be used for printing the identification codes. Alternatively, a scaling factor for enlargement may be used.

It is also possible to apply a scaling factor identical with the reduction factor used for copying to the identification codes SC3 and SC4. In addition, it is also possible to apply a 100% scaling factor, a scaling factor larger than reduction used for the copying, or a scaling factor for enlargement to the modified identification code SCS1 or SCS2.

In the example, it is assumed that the positions in which the modified identification codes SCS1 and SCS2, and the identification codes SC3 and SC4 are printed are the relative positions of the original identification codes SC1-SC4 to the images GZ1-GZ4. However, this may be changed. For example, it is possible to determine the positions regardless of the positions of the original identification codes SC1-SC4 so that the modified identification codes SCS1 and SCS2, and the identification codes SC3 and SC4 are printed in specific positions in the duplicates CP. In such a case, it is also possible to specify the positions of only the modified identification code SCS1 or SCS2.

In the case where copy prohibiting information or transmission prohibiting information is included in the identification codes SC1 and SC2, it is also possible to print the identification codes SC1 and SC2 without deleting them.

In the example described above, a case where 2-in-1 copying is made is described. However, the identification code SC can also be processed in the similar manner in the case of 4-in-1 or N-in-1 (where N is an arbitrary integer) copying.

Figure 5A:
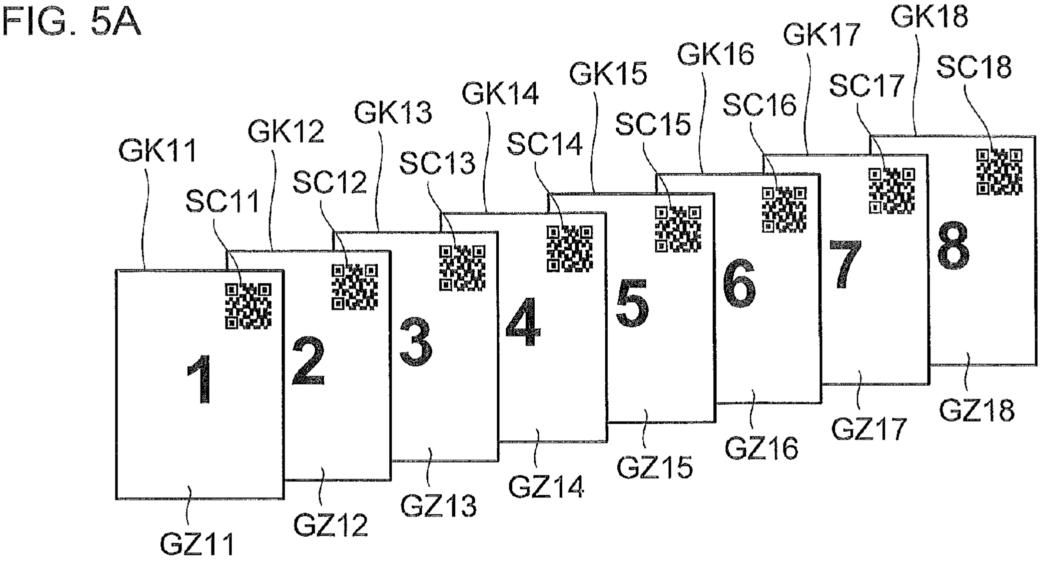
FIGS. 5A-5C illustrate an example of a process in which a booklet copy is made from eight documents.
Figure 5B:
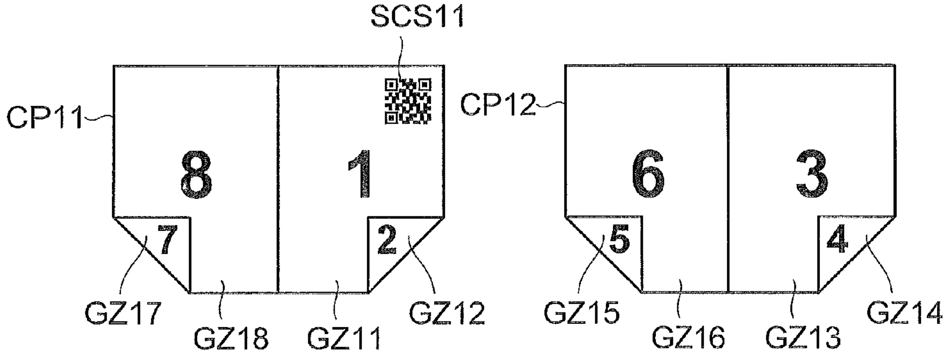
Figure 5C:
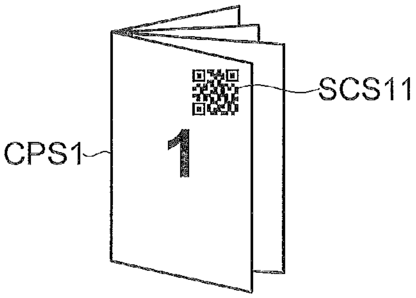

Next, FIGS. 5A-5C illustrate how two duplicates CP11 and CP12 are obtained by copying eight documents GK11-GK18 in a booklet copy mode. The two duplicates CP11 and CP12 are placed with one on top of the other and folded in two to thereby make one booklet CPS1.

As illustrated in FIG. 5A, the documents GK11-GK18 include identification codes SC11-SC18 in addition to original images GZ11-GZ18, respectively. These individual identification codes SC11-SC18 are all identical with one another.

Referring to FIG. 5B, since it is a booklet copy, the first two documents GK11 and GK12 are reduced in size, laid side by side, and printed on one side of a first sheet of paper; the last two documents GK17 and GK18 are reduced in size, laid side by side, and printed on the other side of the first sheet of paper; and the remaining documents GK13-GK16, two as a set, are reduced in size, laid side by side, and printed on two sides of a second sheet of paper, respectively as a set.

It is assumed that the image processing portion GS detects that the identification codes SC11-SC18 are identical with one another and that individual pieces of image data corresponding to the documents GK11-GK18, respectively, belong to a single image data group DL. Then, the image data corresponding to the document GK11 having the smallest page number is determined to be representative image data DLD. This results in deletion of the identification codes SC12-SC18 that have been included in the documents GK12-GK18. Also, a modified identification code SCS11 including information indicating that the identification codes SC12-SC18 have been deleted and it is a booklet copy of the eight documents GK11-GK18 is generated and printed in a manner to replace the original identification code SC11 included in the document GK11. As a result of this, the duplicates CP11 and CP12 can be obtained. As illustrated in FIG. 5C, the two duplicates CP11 and CP12 are folded in two to thereby make a single booklet CPS1.

Consequently, the duplicates CP11 and CP12 do not include identical identification codes SC but include only a single modified identification code SCS11. This makes it possible to detect, analyze, and process only one modified identification code SCS11 when a generation copy is made. Therefore, it is possible to reduce the processing time.

Alternatively, it is possible to leave the identification code SC11 intact without generating the modified identification code SCS11 and simply delete the identification codes SC12-SC18.

Also, in this example, various scaling factors and the printing positions may be applied to the modified identification code SCS11 as in the case of the example illustrated in FIGS. 4A-4C.

Figure 6A:
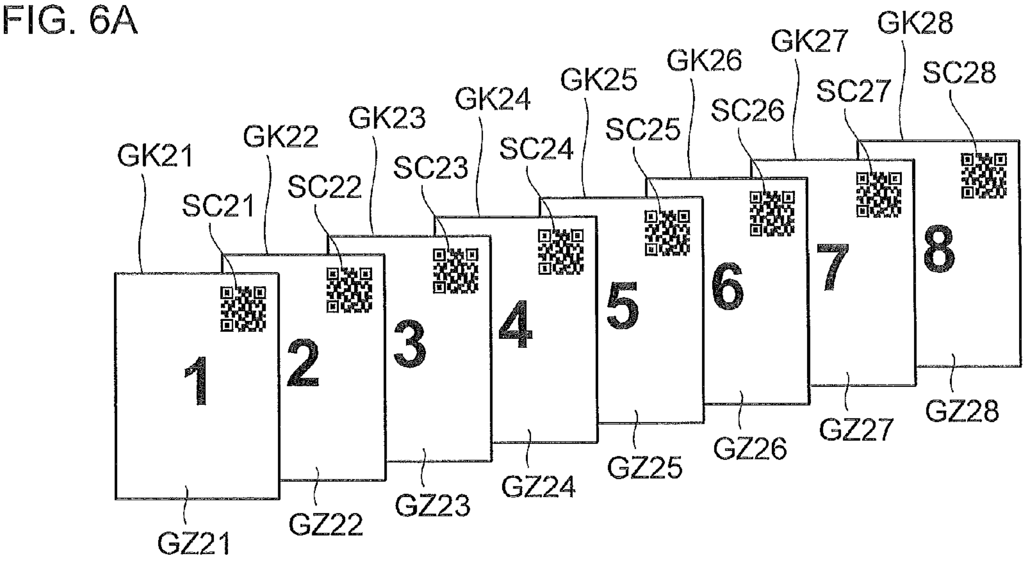
FIGS. 6A-6C illustrate another example of a process in which a booklet copy is made from eight documents.
Figure 6B:
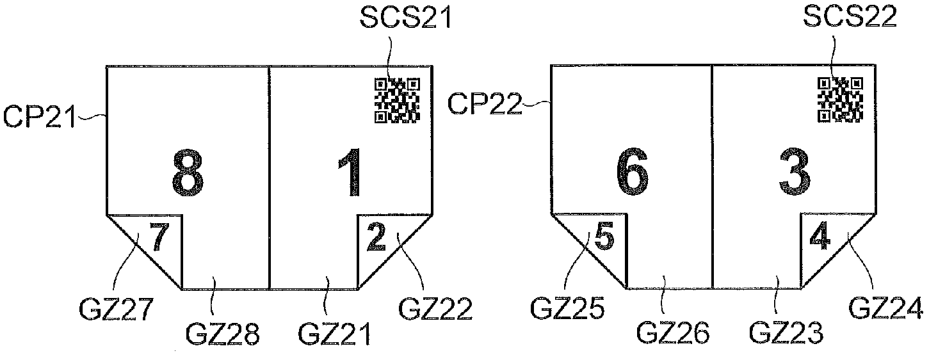
Figure 6C:
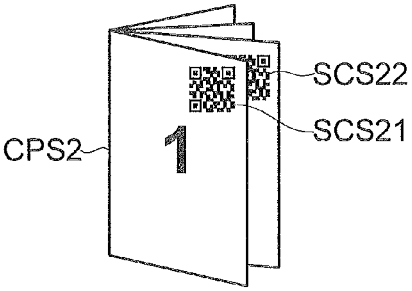

Next, FIGS. 6A-6C illustrate, as in the case of the example illustrated in FIG. 5A-5C, how eight documents GK21-GK28 are copied in a booklet copy mode to obtain two sheets of duplicates CP21 and CP22. The two duplicates CP21 and CP22 are placed with one on top of the other and folded in two to thereby make one booklet CPS2.

As illustrated in FIG. 6A, documents GK21-GK28 individually include original images GZ21-GZ28 and identification codes SC21-SC28. Among these identification codes SC21-SC28, the identification codes SC21, SC22, SC27, and SC28 are identical with one another, and the identification codes SC23, SC24, SC25, and SC26 are identical with one another.

The image processing portion GS detects that the identification codes SC21, SC22, SC27, and SC28 are identical with one another, and that the identification codes SC23, SC24, SC25, and SC26 are identical with one another. Here, it is assumed that individual pieces of image data corresponding to the documents GK21, GK22, GK27, and GK28 belong to an image data group DL1, and individual pieces of image data corresponding to the documents GK23, GK24, GK25, and GK26 belong to another image data group DL2.

Then, the image data of the document GK21 having the smallest page number is determined to be representative image data DLD1 for the image data group DL1. This results in deletion of the identification codes SC22, SC27, and SC28 included respectively in the documents GK22, GK27, and GK28 as illustrated in FIG. 6B. At the same time, a modified identification code SCS21 including information indicating that the identification codes SC22, SC27, and SC28 have been deleted is generated and printed in a manner to replace the identification code SC21 included in the document GK21.

Also, the image data of the document GK23 having the smallest page number is determined to be representative image data DLD2 for the other image data group DL2. This results in deletion of the identification codes SC24, SC25, and SC26 included respectively in the documents GK24, GK25, and GK26. At the same time, a modified identification code SCS22 including information indicating that the identification codes SC24, SC25, and SC26 have been deleted is generated and printed in a manner to replace the identification code SC23 included in the document GK23.

In this way, the duplicates CP21 and CP22 are obtained.

Then, as illustrated in FIG. 6C, the two duplicates CP21 and CP22 are folded in two to make the booklet CPS2.

As a result of this, it is possible to reduce unnecessary identification codes SC and processing time.

Next, a description will be given of a case in which an image of a single document GK is divided into a plurality of images.

Figure 7A:
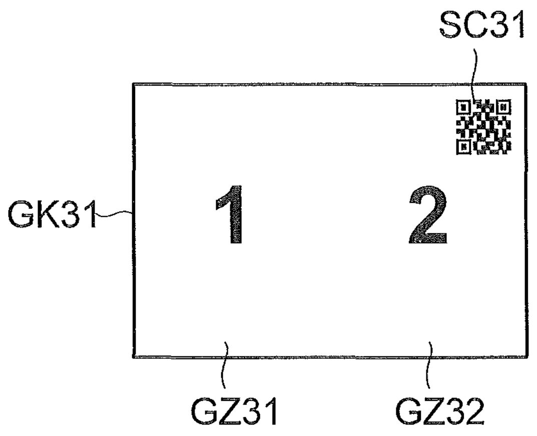
FIGS. 7A and 7B illustrate an example in which copies are made on two different sheets from facing pages of a book
Figure 7B:
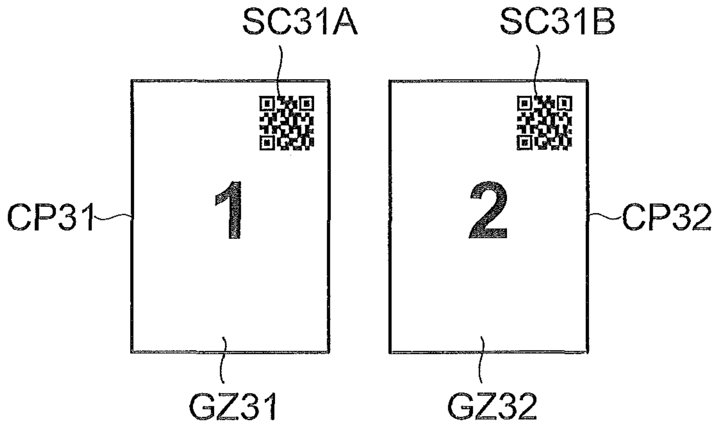

FIGS. 7A and 7B illustrate how a single document GK31 is copied in a book divided copy mode (copies are made on two different sheets from facing pages of a book) to obtain two duplicates CP31 and CP32.

As illustrated in FIG. 7A, the document GK31 has two images GZ31 and GZ32 drawn on the left and right sides thereof. The document GK31 is formed of, for example, two facing left and right pages when a book is opened. The document GK31 has an identification code SC31 drawn in right-upper portion thereof.

In FIG. 7B, since this is a copy in a book divided copy mode, the image of the document GK31 is divided into the images GZ31 and GZ32 and printed on separate sheets of paper. In other words, the divided image GZ31 is printed on a first sheet of paper, and the divided image GZ32 is printed on a second sheet of paper.

During such a process, the image editing portion 44 performs editing so that the detected identification code SC31 is included in (added to) both the divided images GZ31 and GZ32.

FIG. 7B illustrates the duplicates CP31 and CP32 having the divided images GZ31 and GZ32, and identification codes SC31A and SC31B identical with the identification code SC31 printed thereon, respectively.

The size of the document GK31 is A3, and the size of the duplicates CP31 and CP32 is A4. This means that the sizes of the images GZ31 and GZ32 of the duplicates CP31 and CP32 are identical with those of the images GZ31 and GZ32 of the document GK31 (at a 100% scaling factor).

As described above, when a copy is made in a book divided copy mode, identification codes SC are added individually to the duplicates CP obtained as a result of the divided copy. Consequently, when the individual duplicates CP are copied independently from each other in terms of generation copy, it is possible to perform printing control based on the identification codes SC.

In the example described above, the identification codes SC31A and SC31B that are identical with the identification code SC31 are printed in each of the duplicates CP31 and CP32. Instead, however, it is also possible to generate a modified identification codes SCS including information indicating that the copy is resulted from the book divided copy mode and other pieces of information, and print the generated modified identification codes SCS on the individual duplicates CP31 and CP32.

In the example described above, the scaling factor applied to the identification codes SC31A and SC31B is 100% relative to the original identification code SC31 because the divided images GZ31 and GZ32 are of the same size as the original image. Accordingly, any subsequent analysis of the identification codes SC31A and SC31B will not become difficult. Even if the scaling factor applied to the divided images GZ31 and GZ32 is not 100%, the scaling factor applied to the identification codes SC31A and SC31B may be set at 100%. For example, if the scaling factor applied to the divided images GZ31 and GZ32 is for reducing the image in size, the scaling factor applied to the identification codes SC31A and SC31B may be set at 100%, which prevents the subsequent analysis of the identification code from becoming difficult. On the other hand, if the scaling factor applied to the divided images GZ31 and GZ32 is for enlarging the image in size, the scaling factor applied to the identification codes SC31A and SC31B may be set at 100% or at the scaling factor as applied to the images GZ31 and GZ32.

The positions of the identification codes SC31A and SC31B may be determined in accordance with the position of the original identification code SC31, the size of the duplicates CP31 and CP32, a state of the images GZ31 and GZ32, and the like.

Next, referring to a flowchart, a description will be given of a process flow in the image forming apparatus 1.

Figure 8:
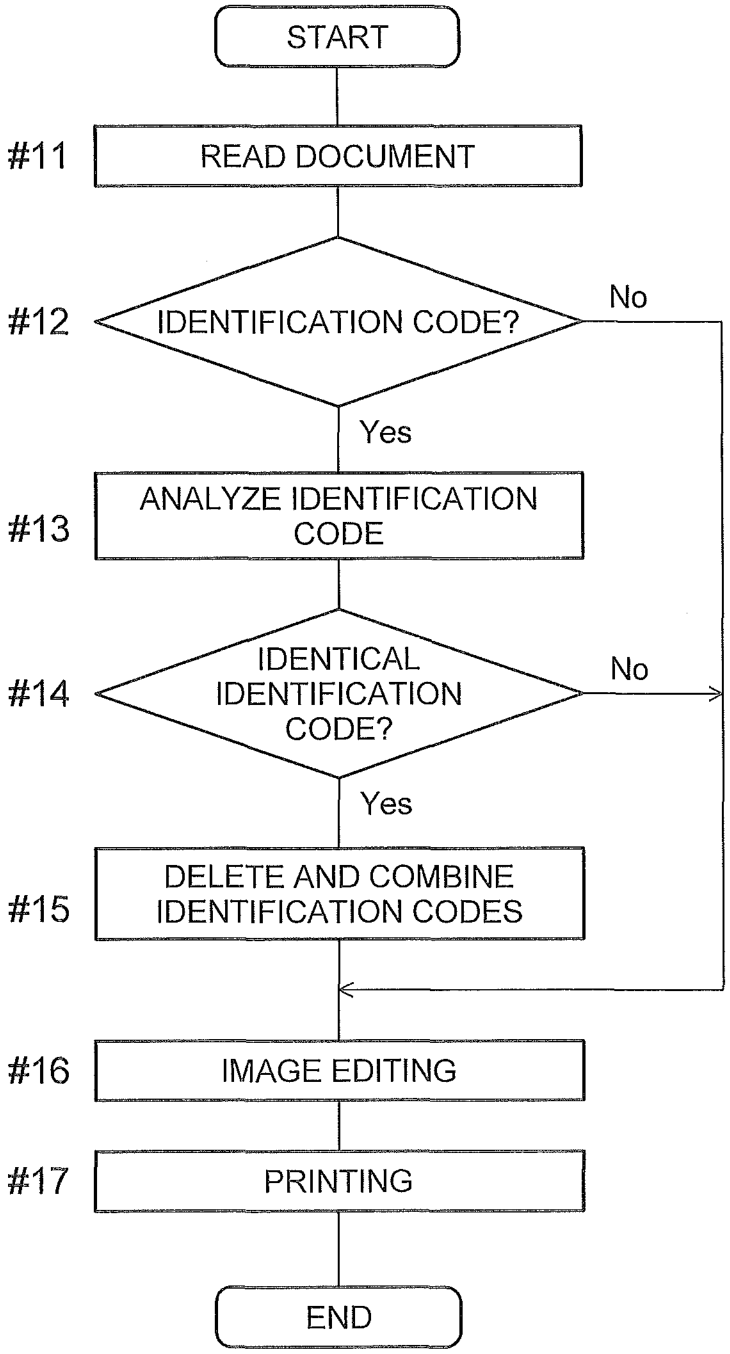
FIG. 8 is a flowchart illustrating a flow of processes in an image forming apparatus.

In FIG. 8, images of document GK are read, and image data D1 thereof is obtained (#11). It is detected whether identification code SC is included or not (#12). If the identification code SC is included (Yes in #12), the identification code SC is analyzed (#13), and it is determined whether there are identical identification codes SC (#14).

Determining whether or not there are identical identification codes SC means such cases as whether the shapes of the identification codes SC are identical; pieces of identification code information DS are all identical; a part of the identification code information DS, e.g., output processing information, is identical; and the like. There is also a case where there are a plurality of groups of image data, i.e., image data groups DL, each of which corresponds to each document GK having identical identification code SC.

If there are identical identification codes SC (Yes in #14), an identification code SC serving as a representative is kept, and others are deleted (#15). At the same time, a modified identification code SCS that will replace the identification code SC serving as a representative is generated as required; the original identification code SC is deleted; and the generated modified identification code SCS is added instead. It is possible to add various pieces of information to the modified identification code SCS. It is possible to arbitrarily decide which identification code SC is designated as a representative and the number of such identification codes.

Image editing is performed according to the specified copy mode (#16), and printing is performed based on the edited image (#17).

According to the embodiment, it is possible to reduce wasteful time by reducing unnecessary identification codes, which is otherwise required for a work such as processing for analyzing identification codes when a generation copy is made.

In the embodiment described above, the image reader 13, the code detection/analysis portion 41, or the control processor 17 corresponds to a first portion in this invention. Furthermore, the code detection/analysis portion 41 and the image group extraction portion 42 correspond to a second portion and a third portion, respectively. The representative image determination portion 45 and the code deletion portion 46 correspond to a fourth portion. The code generation portion 47 and the code addition portion 48 correspond to a fifth portion.

Finally, in the embodiment described above, the configuration of all or part, the circuitry, the quantity, the details or sequence of processing of the image processing portion GS, the control processor 17, and the image forming apparatus 1, and the shapes, the details, the scaling factor, the position, and so on can be modified in various ways within the spirit of the present invention. The above-mentioned unique and distinguished effects can also be attained in such a case as well.

While the embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing method for generating an integrated duplicate by printing images of a plurality of documents on a single sheet of recording paper or a plurality of continuously-fed sheets of recording paper, the method comprising:

a first step of reading each of the plurality of documents and obtaining image data corresponding to said each of the plurality of documents;

a second step of detecting identification codes included in the plurality of documents from individual pieces of the image data;

a third step of extracting image data including identification codes that are identical with one another; and a fourth step of keeping at least one of the identification codes included in the image data extracted in the third step and deleting the identification codes other than said at least one of the identification codes.

2. An image processing method for generating an integrated duplicate by printing images of a plurality of documents on a single sheet of recording paper or a plurality of continuously-fed sheets of recording paper, the method comprising:

a first step of reading each of the plurality of documents and obtaining image data corresponding to said each of the plurality of documents;

a second step of detecting, from the image data, identification codes that are included in the documents and include output processing information which is information relating to an output processing method for the image data;

a third step of extracting an image data group made up of one or more pieces of image data including the output processing information that is identical with one another, the output processing information being included in the identification codes; and a fourth step of determining, within the image data group, at least one piece of representative image data, and deleting, within the image data group, the identification codes included in the image data other than said at least one piece of representative image data.

3. The image processing method according to claim 2, further comprising a fifth step of generating and adding, to said at least one piece of representative image data, a modified identification code including therein information on the deleted identification codes in place of the identification code included in said at least one piece of representative image data.

4. An image processing apparatus for producing an integrated duplicate by printing images of a plurality of documents on a single sheet of recording paper or a plurality of continuously-fed sheets of recording paper, the apparatus comprising:

a first portion that reads each of the plurality of documents and obtains image data corresponding to said each of the plurality of documents;

a second portion that detects, from the image data, identification codes included in the documents and including output processing information which is information relating to an output processing method for the image data;

a third portion that extracts an image data group made up of one or more pieces of image data including the output processing information that is identical with one another, the output processing information being included in the identification codes; and a fourth portion that determines, within the image data group, at least one piece of representative image data and deletes, within the image data group, the identification codes included in the image data other than said at least one piece of representative image data.

5. The image processing apparatus according to claim 4, further comprising a fifth portion that generates and adds, to said at least one piece of representative image data, a modified identification code including therein information on the deleted identification codes in place of the identification code included in said at least one piece of representative image data.

6. The image processing apparatus according to claim 5, wherein the modified identification code includes information that identifies the image data from which the identification code is deleted, the image data being included in the image data group to which said at least one piece of representative image data belongs.

7. The image processing apparatus according to claim 4, wherein, when the output processing information includes information indicating that duplication or transmission of a part or a whole of the image data is prohibited, the fourth portion does not delete the identification code for the image data.

8. The image processing apparatus according to claim 5, wherein the second portion obtains positional information identifying a position of the identification code in an image corresponding to the image data, and the fifth portion determines a position for adding the modified identification code based on the positional information.

9. The image processing apparatus according to claim 5, wherein the fifth portion generates the modified identification code in a size corresponding to a predetermined scaling factor relative to a size of the identification code.

10. A nontransitory computer-readable storage medium storing thereon a computer program executed by a computer provided in an image forming apparatus that produces an integrated duplicate by printing images of a plurality of documents on a single sheet of recording paper or a plurality of continuously-fed sheets of recording paper, the computer program, when read and executed by the computer, causing the image forming apparatus to implement:

a first portion that reads each of the documents and obtains image data corresponding thereto;

a second portion that detects identification codes included in the documents from individual pieces of the image data;

a third portion that extracts the image data including the identification codes that are identical with one another; and a fourth portion that keeps at least one of the identification codes which are included in the image data extracted by the third portion and deletes the identification codes other than said at least one of the identification codes.

11. A nontransitory computer-readable storage medium storing thereon a computer program executed by a computer provided in an image forming apparatus that produces an integrated duplicate by printing images of a plurality documents on a single sheet of recording paper or a plurality of continuously-fed sheets of recording paper, the computer program, when read and executed by the computer, causing the image forming apparatus to implement:

a first portion that reads each of the plurality of documents and obtains image data corresponding to said each of the plurality of documents;

a second portion that detects, from the image data, identification codes that are included in the documents and include output processing information which is information relating to an output processing method for the image data;

a third portion that extracts an image data group made up of image data including the output processing information that is identical with each another; and a fourth portion that determines, within the image data group, at least one piece of representative image data, and deletes, within the image data group, the identification codes included in the image data other than said at least one piece of representative image data.

12. The nontransitory computer-readable storage medium according to claim 11, wherein the computer program causes the image forming apparatus to further implement a fifth portion that generates and adds, to said at least one piece of representative image data, a modified identification code including therein information on the deleted identification codes in place of the identification code included in said at least one piece of representative image data.

* * * * *